(12) United States Patent
Galant

(10) Patent No.: US 10,051,980 B2
(45) Date of Patent: Aug. 21, 2018

(54) SECURE MOUNTING SYSTEM FOR INTERACTIVE COMPONENT DISPLAY

(71) Applicant: COMPUCAGE INTERNATIONAL INC., Kleinburg (CA)

(72) Inventor: Steve N. Galant, Kleinburg (CA)

(73) Assignee: COMPUCAGE INTERNATIONAL INC., Kleinburg, Ontario (CA)

( * ) Notice: Subject to any disclaimer, the term of this patent is extended or adjusted under 35 U.S.C. 154(b) by 0 days.

(21) Appl. No.: 15/472,577

(22) Filed: Mar. 29, 2017

(65) Prior Publication Data

US 2017/0280898 A1      Oct. 5, 2017

Related U.S. Application Data

(60) Provisional application No. 62/314,793, filed on Mar. 29, 2016.

(51) Int. Cl.
| | |
|---|---|
| *A47B 91/00* | (2006.01) |
| *A47F 5/16* | (2006.01) |
| *A47F 7/00* | (2006.01) |
| *F16B 35/06* | (2006.01) |
| *F16C 11/06* | (2006.01) |
| *F16M 13/02* | (2006.01) |
| *F16B 9/00* | (2006.01) |
| *F16B 11/00* | (2006.01) |
| *F16M 11/14* | (2006.01) |

(Continued)

(52) U.S. Cl.
CPC .................. *A47F 5/16* (2013.01); *A47F 7/00* (2013.01); *F16B 9/00* (2013.01); *F16B 11/006* (2013.01); *F16B 35/06* (2013.01); *F16B 37/048* (2013.01); *F16C 11/0695* (2013.01); *F16M 11/14* (2013.01); *F16M 13/02* (2013.01); *F16M 13/022* (2013.01); *A47F 3/002* (2013.01); *A47F 5/0093* (2013.01); *A47F 5/0823* (2013.01); *A47F 2005/165* (2013.01); *F16B 37/16* (2013.01)

(58) Field of Classification Search
CPC .... F16M 2200/00; F16M 13/00; A47F 7/024; A47F 7/00; Y10T 70/5031
See application file for complete search history.

(56) References Cited

U.S. PATENT DOCUMENTS 4,421,943 A * 12/1983 Withjack ............... F24J 2/5264
126/569
5,169,114 A * 12/1992 O'Neill ............... E05B 73/0082
248/316.4
(Continued)

*Primary Examiner* — Amy J. Sterling
(74) *Attorney, Agent, or Firm* — Westman, Champlin & Koehler, P.A.

(57) ABSTRACT

A mounting system for securely mounting a component, comprising: a mounting platform having a support surface with plurality of mounting holes extending therethrough; a mounting device for securing the component to the mounting platform, the mounting device comprising: a mounting plate with a planar surface facing in a first direction and a stud extending in a second direction away from the first direction, the stud being configured to be inserted through the mounting holes; an adhesive secured to the planar surface and having an engagement surface for adhering to a surface of the component; a fastening device for releasably engaging a portion of the stud inserted through one of the mounting holes to releasably secure the mounting device to the mounting plate.

13 Claims, 25 Drawing Sheets

(51) Int. Cl.
  *F16B 37/04* (2006.01)
  *F16B 37/16* (2006.01)
  *A47F 3/00* (2006.01)
  *A47F 5/00* (2006.01)
  *A47F 5/08* (2006.01)

(56) References Cited

U.S. PATENT DOCUMENTS

| | | | | |
|---|---|---|---|---|
| 5,778,805 | A | * | 7/1998 | Green ................ E05B 65/0075 109/51 |
| 7,866,623 | B2 | * | 1/2011 | Lampman ............... A47F 7/024 248/186.2 |
| 8,387,937 | B2 | * | 3/2013 | Ye .......................... F16M 11/10 248/346.01 |
| 2007/0290115 | A1 | * | 12/2007 | Meyer ................ E05B 73/0082 248/346.06 |

* cited by examiner

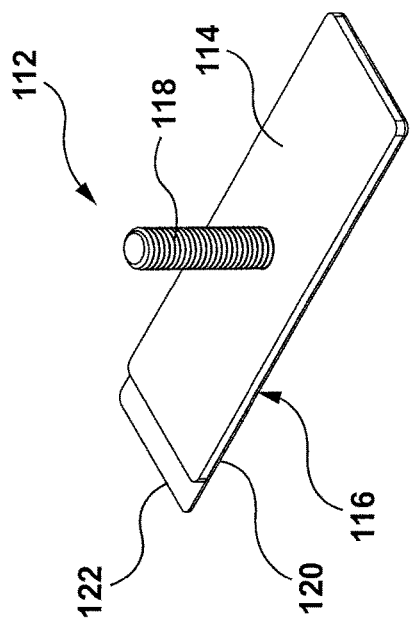
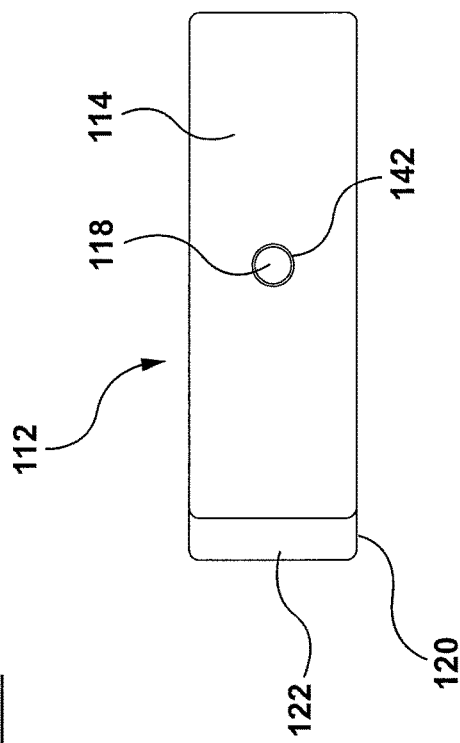
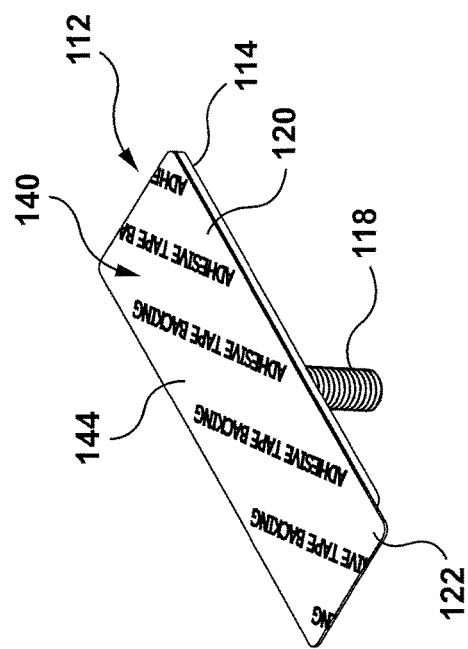
FIG. 4A
FIG. 4B
FIG. 4C

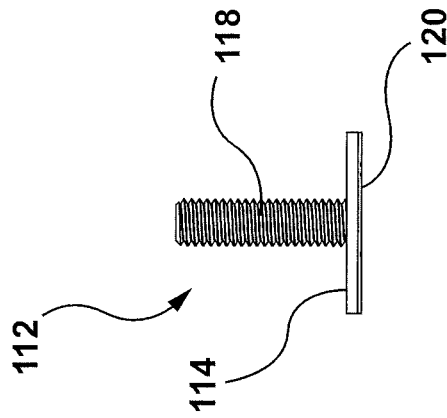
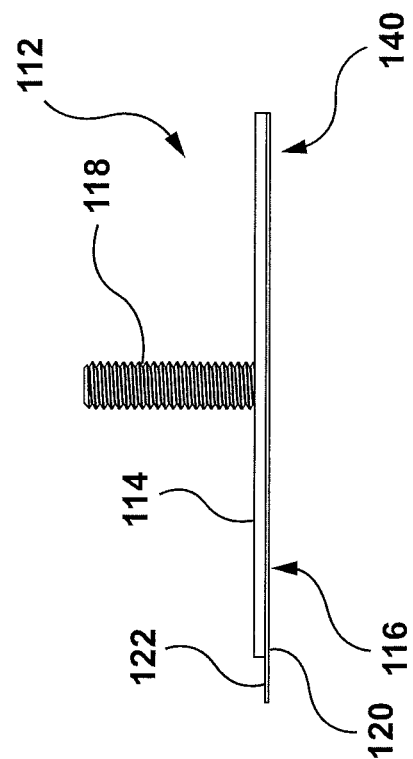
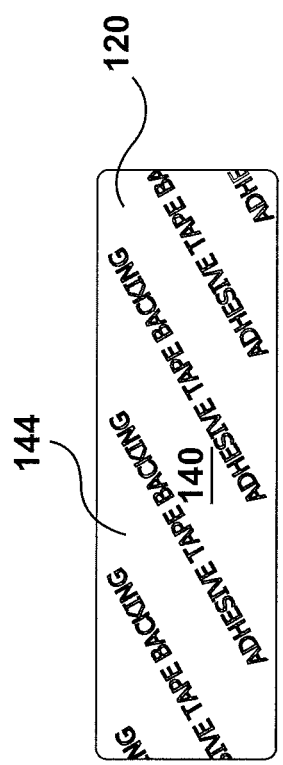

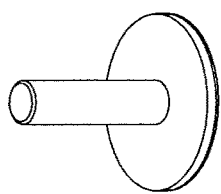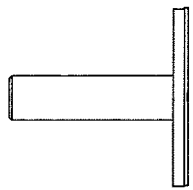
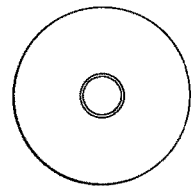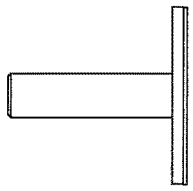
FIG. 21
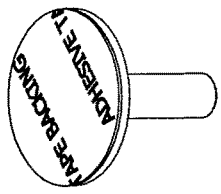

SECURE MOUNTING SYSTEM FOR INTERACTIVE COMPONENT DISPLAY

CROSS-REFERENCE TO RELATED APPLICATIONS

This application is a non-provisional application of U.S. Provisional Application No. 62/314,793, filed on Mar. 29, 2016, which is hereby incorporated by reference in its entirety.

BACKGROUND

This application relates to a secure mounting system for mounting interactive components for display or use.

Retailers who sell high theft risk components such as laptop computers, tablet computers and smart phones typically want to display sample products in a manner that prevents the unauthorized removal of products while at the same time minimizes interference with the user experience in viewing and interacting with the sample products. Additionally, retailers typically want to avoid permanent damage to or marking of the displayed products that would devalue the products.

SUMMARY

A mounting system for securely mounting a component, comprising: a mounting platform having a support surface with plurality of mounting holes extending therethrough; a mounting device for securing the component to the mounting platform, the mounting device comprising: a mounting plate with a planar surface facing in a first direction and a stud extending in a second direction away from the first direction, the stud being configured to be inserted through the mounting holes; an adhesive secured to the planar surface and having an engagement surface for adhering to a surface of the component; a fastening device for releasably engaging a portion of the stud inserted through one of the mounting holes to releasably secure the mounting device to the mounting plate.

BRIEF DESCRIPTION OF THE DRAWINGS

Reference will now be made, by way of example, to the accompanying drawings which show example embodiments of the present application, and in which:

FIG. 4A is a top perspective view of one of the mounting devices of FIG. 2 without a fastener;

FIG. 4B is a bottom plan view of the mounting device;

FIG. 4C is a bottom perspective view of the mounting device;

FIG. 4D is a side view of the mounting device;

FIG. 4E is an end view of the mounting device;

FIG. 4F is a top plan view of the mounting device;

FIGS. 19 to 24 each show a plurality of views of alternative mounting device configurations that can used in the secure mounting system, according to example embodiments.

Similar reference numerals may have been used in different figures to denote similar components.

DESCRIPTION OF EXAMPLE EMBODIMENTS

This document describes example embodiments of a secure mounting system for mounting interactive components. The secure mount system may for example be used in a retail location to secure a high theft risk component against unauthorized removal. The secure mount system can also be used in other environments where multiple people will have access to the component, such as a public building for example. In at least some embodiments, the secure mount system described below secures a component while minimizing interference with access to and viewing of user interface elements of the component such as display screens, touch screens and keyboards. Additionally, in at least some embodiments the secure mount system does not interfere with venting air paths of the component and can be removed from the component with little or no residual damage or marking to the component.

Figure 1:
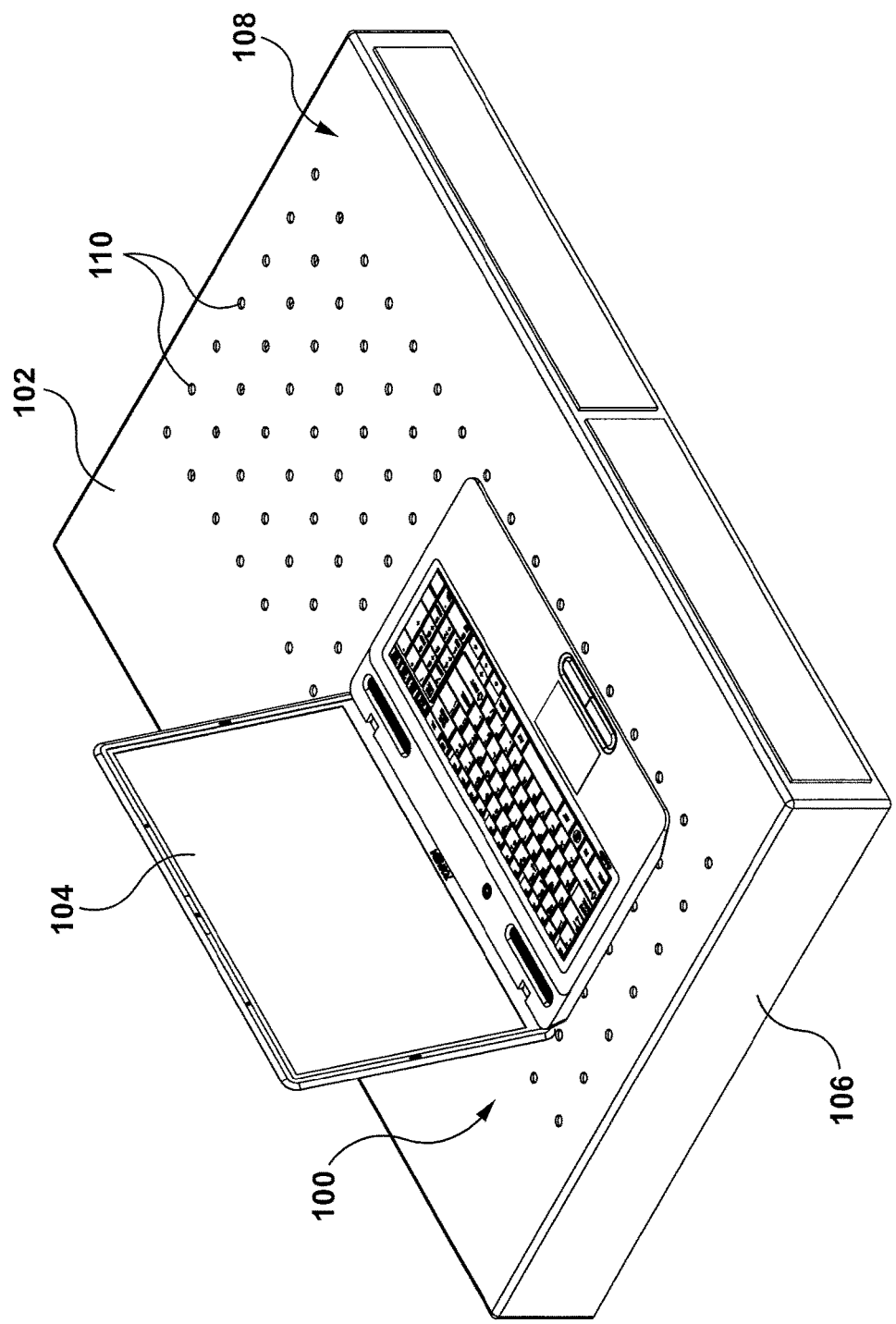
FIG. 1 is a perspective view of a secure mounting system according to an example embodiment in which the system is used to secure a high theft risk component such as a laptop computer.

In this regard, FIG. 1 shows a perspective view of a secure mounting system 100 according to an example embodiment in which the system 100 is used to secure a high theft risk component 104 such as a laptop computer to a stationary display structure 106. In the illustrated embodiment, the stationary display structure 106, which could for example be part of a counter or table in a retail setting, has an integrated mounting platform 102 that has a horizontal support surface 108 with a plurality of mounting holes 110 extending through the support surface 108 to a lower surface that is not visible in FIG. 1. The mounting holes 110 are arranged in an array of rows and columns with uniform spacing.

Although the component 104 shown in FIG. 1 is a laptop computer, the secure mounting system 100 can be used to secure a variety of different types of components, including for example tablets, smart phones, GPS devices, media players and the like.

Figures 2, 3:
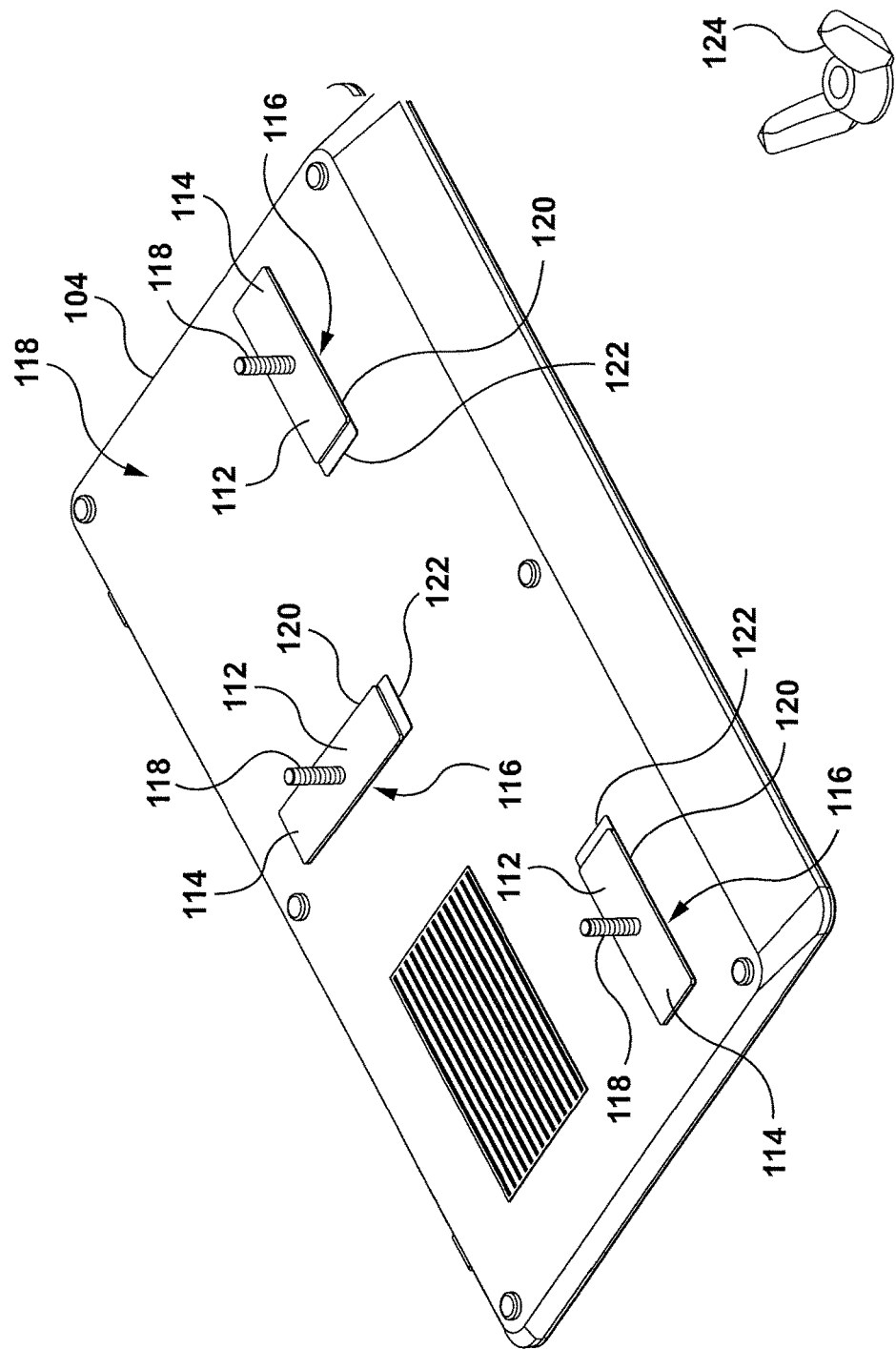
FIG. 2 is a perspective view showing the bottom of a component with a plurality of mounting devices that are part of the secure mounting system of FIG. 1 mounted to the component
FIG. 3 is a perspective view of a fastener of a mounting device of FIG. 2 according to an example embodiment.

Referring to FIGS. 2 and 3, the system 100 includes a plurality mounting devices 112 that are adhered to a bottom surface 113 of the component 104 and that are used to releasably secure the component to the mounting platform 102. It will be noted that the mounting devices 112 are not visible in FIG. 1 as they are located between the bottom of the component 104 and the mounting platform 102. Thus, the system 100 does not interfere with the ability of user such as a prospective purchaser to view and interact with all of the visual and touch user interface elements of the component 104 such as, in the case of a laptop computer, the display screen and keyboard.

The mounting devices 112 each include a mounting plate 114 with a planar surface 116 facing in a first direction and a stud 118 extending in a second direction away from the first direction. The stud 118 is configured to be inserted through any of the mounting holes 110. An adhesive 120 is secured to the planar surface 116 of the mounting plate 114 and has an engagement surface adhering to a back surface 113 of the component. Each mounting device 112 includes a fastening device 124 for releasably engaging a portion of the stud inserted through one of the mounting holes 110 to releasably secure the mounting device 112 to the mounting platform 102.

Figure 25:
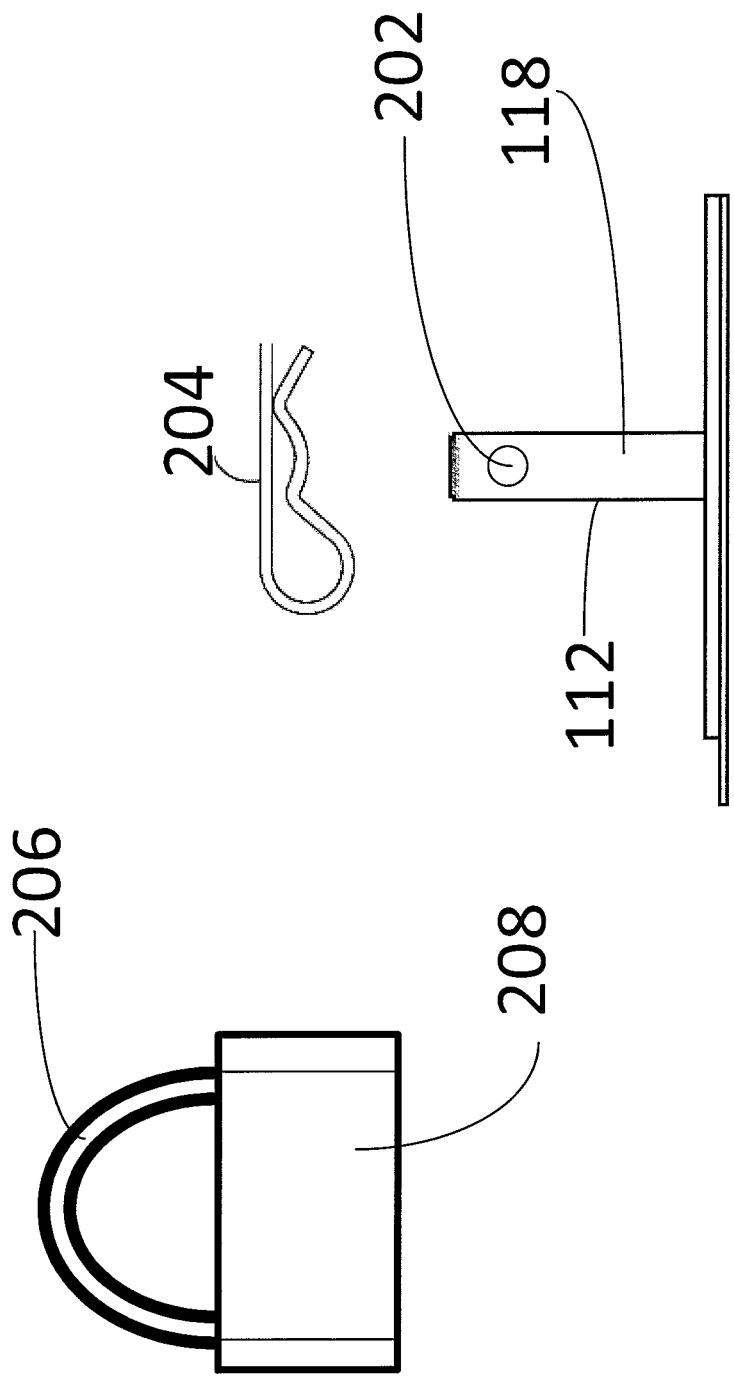
FIG. 25 shows an alternative mounting device configuration.

In the illustrated embodiment, each stud 118 is threaded and its corresponding fastener 124 is a wing nut. However, in other embodiments alternative securing configurations could be used. For example, as shown in FIG. 25, each stud 118 could include a thru-hole 202 in its extending end and the fastener could take the form of a key or combination activated lock 208 having a releasable shank 206 that can be inserted through the thru-hole 202, or a cotter pin 204 having a pin or wedge that can be inserted through the thru-hole 202 to secure the mounting device 112 to the mounting platform 102 and subsequently removed to release the mounting device 112. In some examples, different types of fastening devices can be used with different mounting devices, such as wing nuts or cotter pins used for most mounting devices and at least one key or combination lock device for one of the mounting devices to provide additional security.

FIGS. 4A-4F show the mounting device 112 (without fastener 124) in a number of different views. In an example embodiment, the mounting plate 114 is a metal rectangular plate formed from steel, stainless steel or aluminum and has a thru hole 142 (FIG. 4B) through its center for stud 118. In an example embodiment stud 118 is a self-clinching threaded stud formed from steel, stainless steel or aluminum such that during manufacture of the mounting device 122 the stud 118 can be fixed to mounting plate 114 by inserting the stud 118 into thru hole 118 and using an anvil to press the stud 118 into place. Although a self-clinching stud provides cost effective manufacturing, in other examples, stud 118 could be secured to plate 114 using alternative means such as welding. In some embodiments, the plate 114 and stud 118 could be formed from non-metallic materials such as rigid plastics or carbon fiber reinforced materials.

In an example embodiment, adhesive 120 is a double sided tape. By way of example, a commercially available tape is Duraco High Bond® Tape, which is a high performance acrylic foam core tape that is available in a clear color and is tamper resistant, effective for bonding dissimilar metals, and resistant to temperature cycles. The adhesive 120 is secured to the planar surface 116 of the mounting plate 114 and has an engagement surface 140 (FIGS. 4A and 4F) for adhering to the back surface 113 of the component 104. Prior to use the engagement surface 140 is covered with a removable backing 144 (labeled "ADHESIVE TAPE BACKING" in the Figures) that protects the engagement surface 140 prior to installation on the component 104.

In example embodiments, once a mounting device 112 is secured to component 104 using the adhesive 120 the mounting device 112 cannot be removed absent a large amount of force being applied simultaneously in opposite directions to the mounting device 112 and the component 104. In example embodiments, the degree of required force is such that the component 104 will likely be damaged to the extent of being valueless, hence removing an incentive for any unauthorized removal. Adhesive 120 is also resistant to shear cutting that may be attempted for example by using a thin blade or piano wire slid between the component 104 and the mounting device. However, in example embodiments, the adhesive can be removed relatively easily by applying shear force on the adhesive alone, independently of both the mounting device 112 and the component 104, in a direction that is parallel to opposing surfaces of the mounting device 112 and the component 104. In order to allow such a force to be applied, in example embodiments, a portion 122 of the adhesive 120 extends beyond an edge of the mounting plate 114 to enable the edge of the adhesive 120 to be grasped and pulled in a shear direction that is parallel to the planar surface 116 to facilitate simultaneous removal of the adhesive 120 from both the planar surface 116 and the surface 113 of the component 104.

As noted above, when the component 104 is secured to the mounting platform 102, the mounting devices 112 are hidden from view. Additionally, the graspable portion 122 of the adhesive 120 of each mounting device 112 is located between the component 104 and the mounting platform 102 and thus cannot be accessed when the component 104 is secured to the mounting platform 102. In order to access and remove the adhesive 120, the mounting devices 112 must be released from platform 102.

Although different sizes and shapes of mounting devices 112 can be used in different applications, in one non-limiting example provided for explanatory purposes: the mounting plate 114 has rectangular dimensions of 3.5 inches by 1.5 inches, is formed from stainless steel and has a thickness of 0.0625 inches; self clinching stud is 1 inch long with a diameter of ¼ inch and is formed from stainless steal; and adhesive 120 is 3.75 inches by 1.5 inches to cover the entire surface of the mounting plate 114 and provide an extending edge portion of 0.25 inches to grip for removal, and is DURACO HIGH BOND®-DHB23 double sided tape. Accordingly, in one example embodiment the mounting plate has a surface area of at least 5 square inches (3.5× 1.5=5.25 square inches), although other dimensions and areas can be sufficient in various applications.

In example embodiments, the security system 100 also includes a transparent acrylic template 160 (FIG. 6) having a plurality of template holes 162 arranged in an array that aligns with the mounting holes 110 of the mounting platform 102. As will be explained in greater detail below, the template 160 facilitates alignment of the mounting devices 112 on the surface 113 of the component 104 to permit the studs 118 to be inserted through the mounting holes 110 of the mounting plate 102.

In example embodiments, the mounting platform 102 and a plurality of mounting devices 112, and template 160 are distributed and sold as a kit with access to corresponding instructions to secure a component. Additional mounting devices 112 and replacement adhesive 120 can be purchased independently. The instructions could for example take the form of one or more of a printed sheet or an instructional video hosted on a remote server or burned onto a physical medium such as a DVD.

Figure 5:
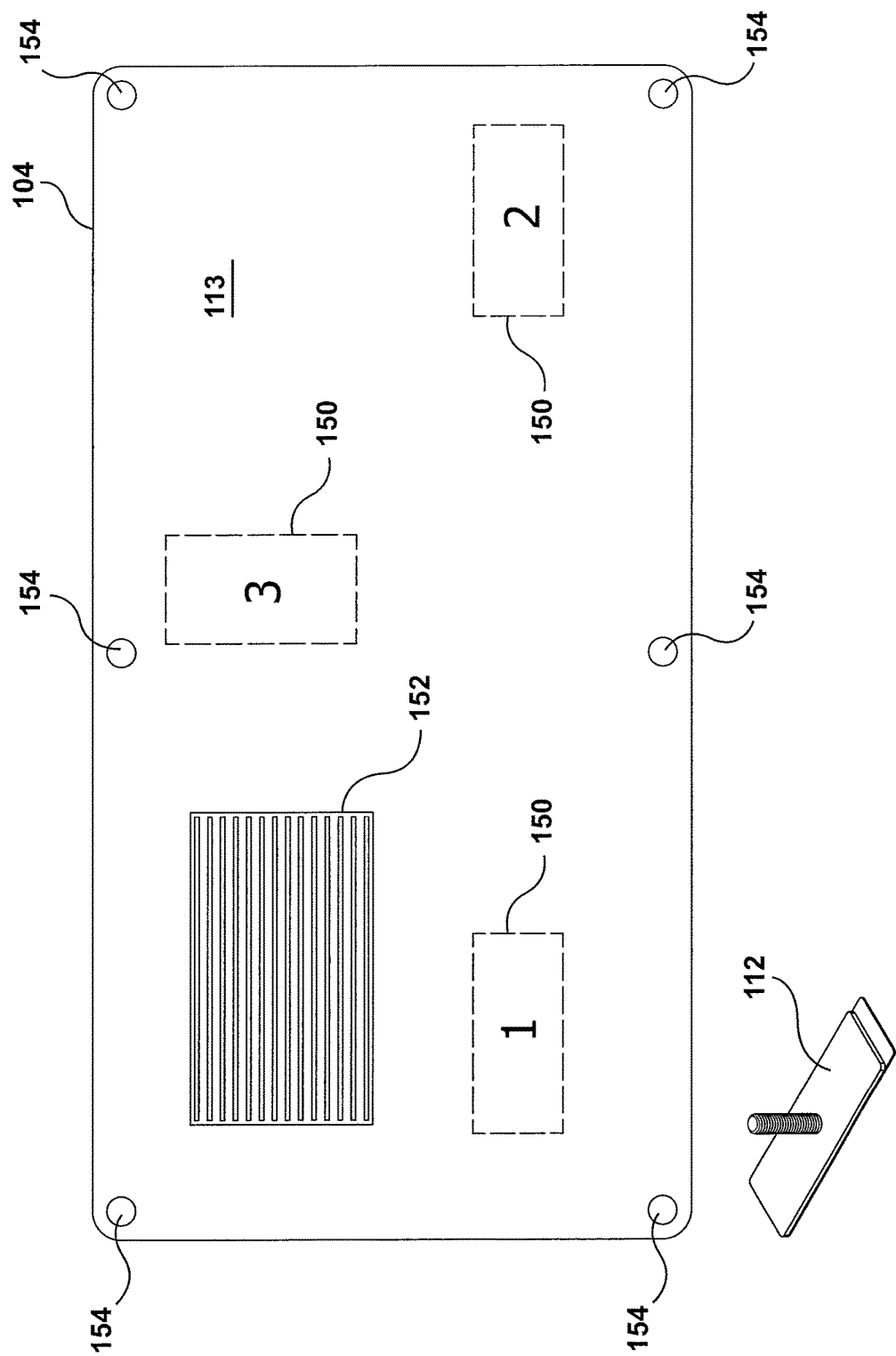
FIG. 5 shows the bottom of a component with suggestions as to where to position mounting devices of the secure mounting system.

An example method of using the security system 100 to secure a component 104 will now be described. Such a method could for example be described and/or illustrated in the corresponding instructions. Referring to FIG. 5, in example the corresponding instructions provided with security system 100 may provide suggested positioning for mounting device 112 on the base of the component 104. As can be seen in FIG. 5, the bottom surface 113 of component 104 is not a perfectly planar surface and includes a number of irregularities and protuberances including for example standoffs or feet 154 and vent openings 152. Generally, in order to provide a good bonding surface for adhesive 120 and minimize any impact on component performance, the mounting devices 112 should be located on bottom surface 113 to avoid all of the irregularities and protuberances 152, 154, and in this regard FIG. 5 shows three suggested positions "1", 2" and "3" indicated with dashed outlines 150 that illustrate suggested positioning of mounting devices 112. The corresponding instructions may specify how many mounting devices 112 should be used per component based on component size and general positioning rules such as "DO NOT PLACE ON PROTRUDING EXTRUSIONS OR PRODUCT FEET"; "DO NOT PLACE OVER HEAT SINK OR COOLING VENTS"; "ENSURE NO LESS THEN 1.5 INCH MINIMUM DISTANCE TO PRODUCT EDGE"; and "DO NOT PLACE OVER PRODECT LABELS/BAR-CODES", by way of example.

Figure 6:
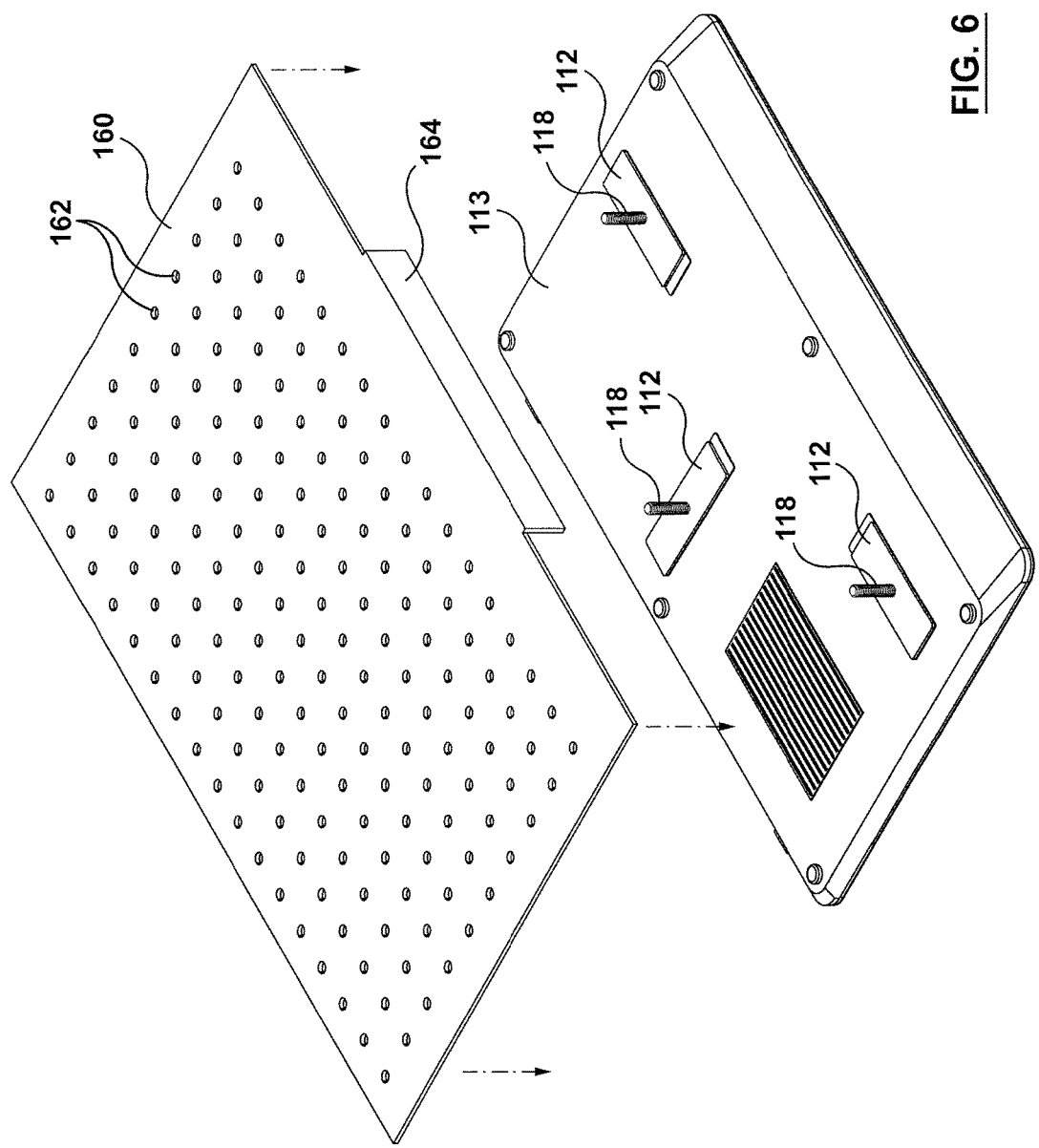
FIGS. 6, 7 and 8 are perspective views showing a template of the secure mounting system being used to position mounting devices on a component according to an example embodiment.
Figure 7:
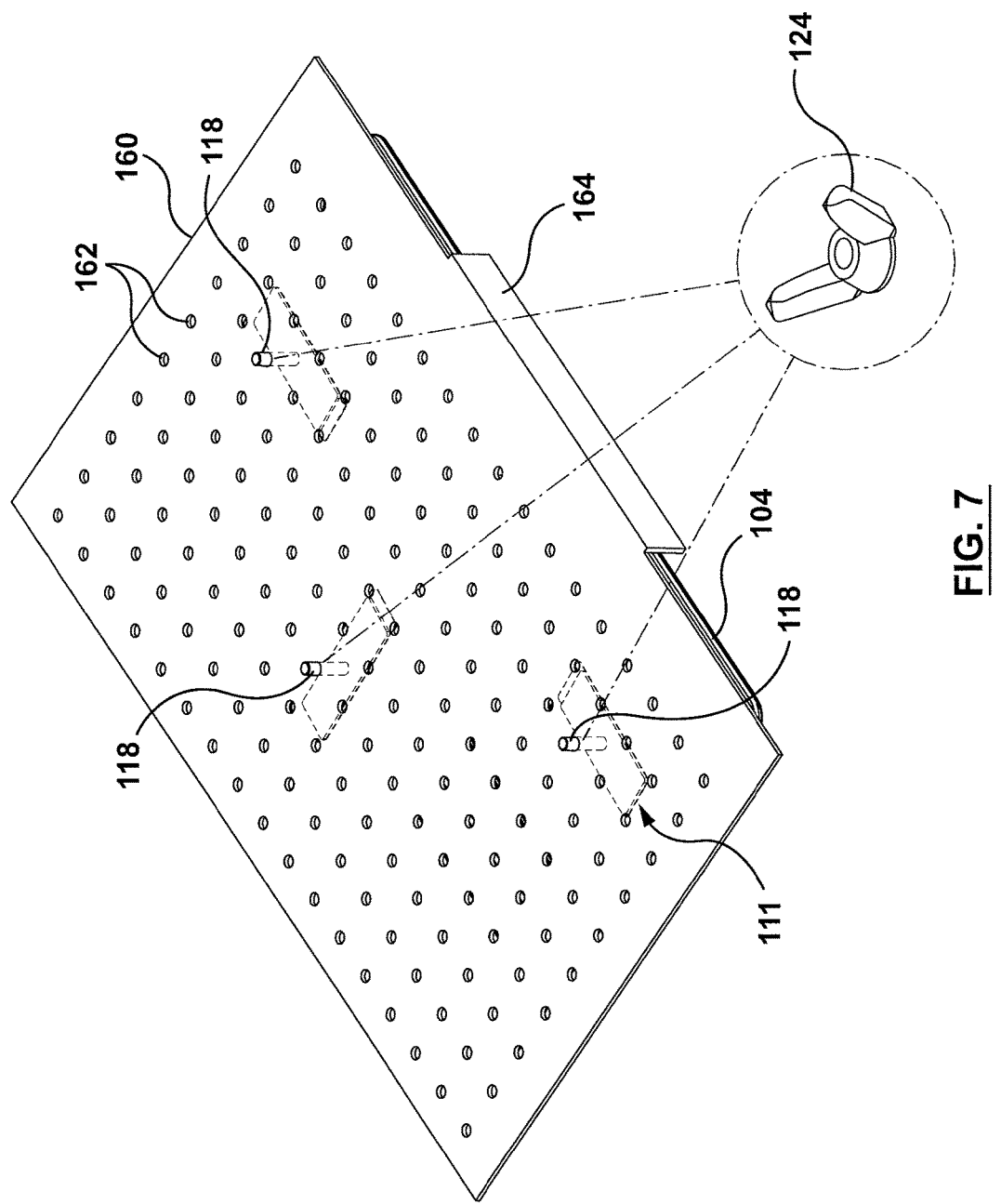
Figure 8:
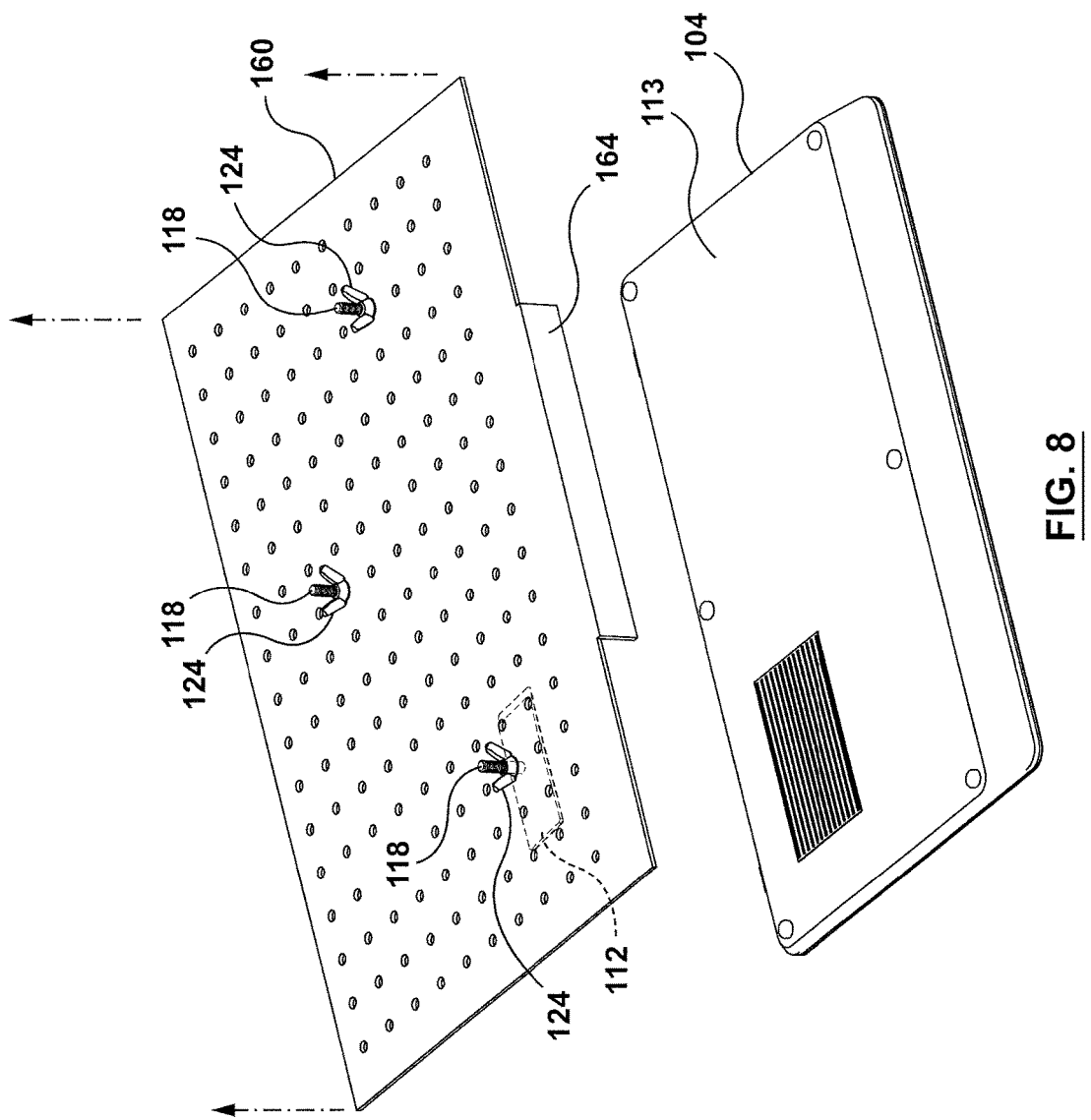

Thus, in an example embodiment, the corresponding instructions indicate that the component 104 should be placed on a surface with its bottom surface 113 facing upwards, and a recommended number of mounting devices 112 be positioned on the surface generally in the recommend locations. In particular, at the time of initial positioning, the engagement surface 140 of adhesive 120 on each of the mounting devices 112 is covered with the removable backing 144 such that the position of the mounting devices 112 can be adjusted. The template 160 is then used to accurately position the mounting devices 112 so that the respective studs 118 will align with holes 110 in the mounting platform, 110. In this regard, FIG. 6 shows template 160 being lowered towards the unsecured mounting devices 112 that have been laid on the back surface 113 of component 104. In embodiments where the template is formed from a transparent material such as clear acrylic, the user is able to see through the template 160 and manually shift the relative positions of the mounting devices 112 so that each of the studs 118 align with a respective hole 162 in the template 160, enabling the template to be lowered to rest on the back surfaces of the mounting devices 112 as shown in FIG. 7 with studs 118 protruding through respective holes 162. In an example embodiment, a wing nut fastener 124 is screwed on to each of the studs 118 to secure the respective mounting devices 112 to the template 160.

As noted above, the holes 162 in template 160 are arranged in an array that aligns with the holes 110 in mounting platform 102. In some examples, a lateral flange 164 is provided on one or more edges of the template 160 to assist in squaring up and aligning the template 160 relative to the component 104.

As shown in FIG. 4, after the mounting devices 112 are secured by fasteners 124 to the template 160, the template 160 is lifted up from the component 104 with the mounting devices 112. The removable backing 144 is then taken off the engagement surfaces 140 of the adhesive 120 on each of the mounting devices 112 and the template 160, together with the mounting devices 112, are lowered back down onto the back surface 113 of the component 104 and pressure applied to secure the adhesive 120 of the mounting devices 112 to the back surface 113. The fasteners 124 are then removed from studs 118 and the template 160 removed.

Figure 9:
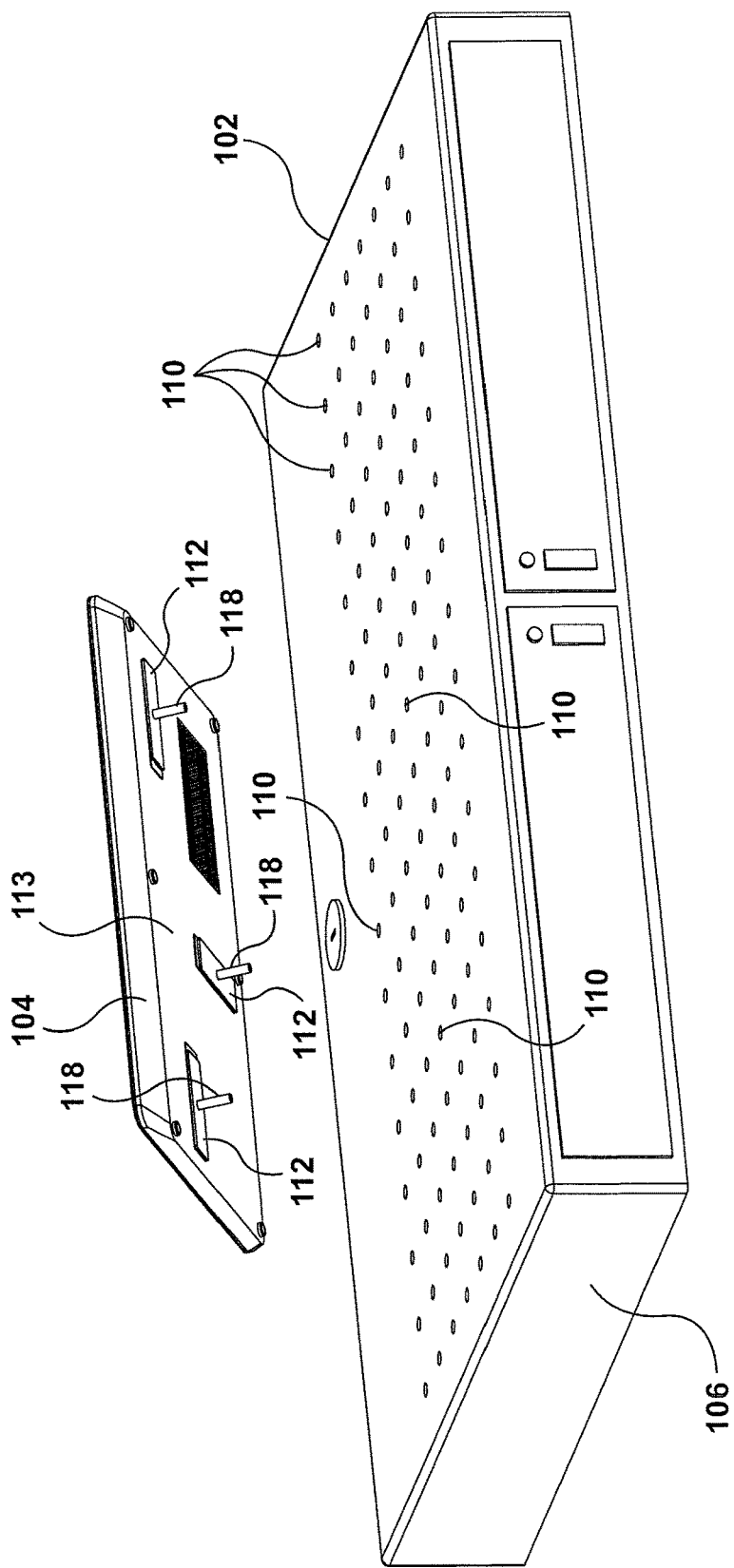
FIG. 9 is a perspective view showing a component with secured mounting devices being lowered to a mounting platform of the security system in an example embodiment.
Figure 10:
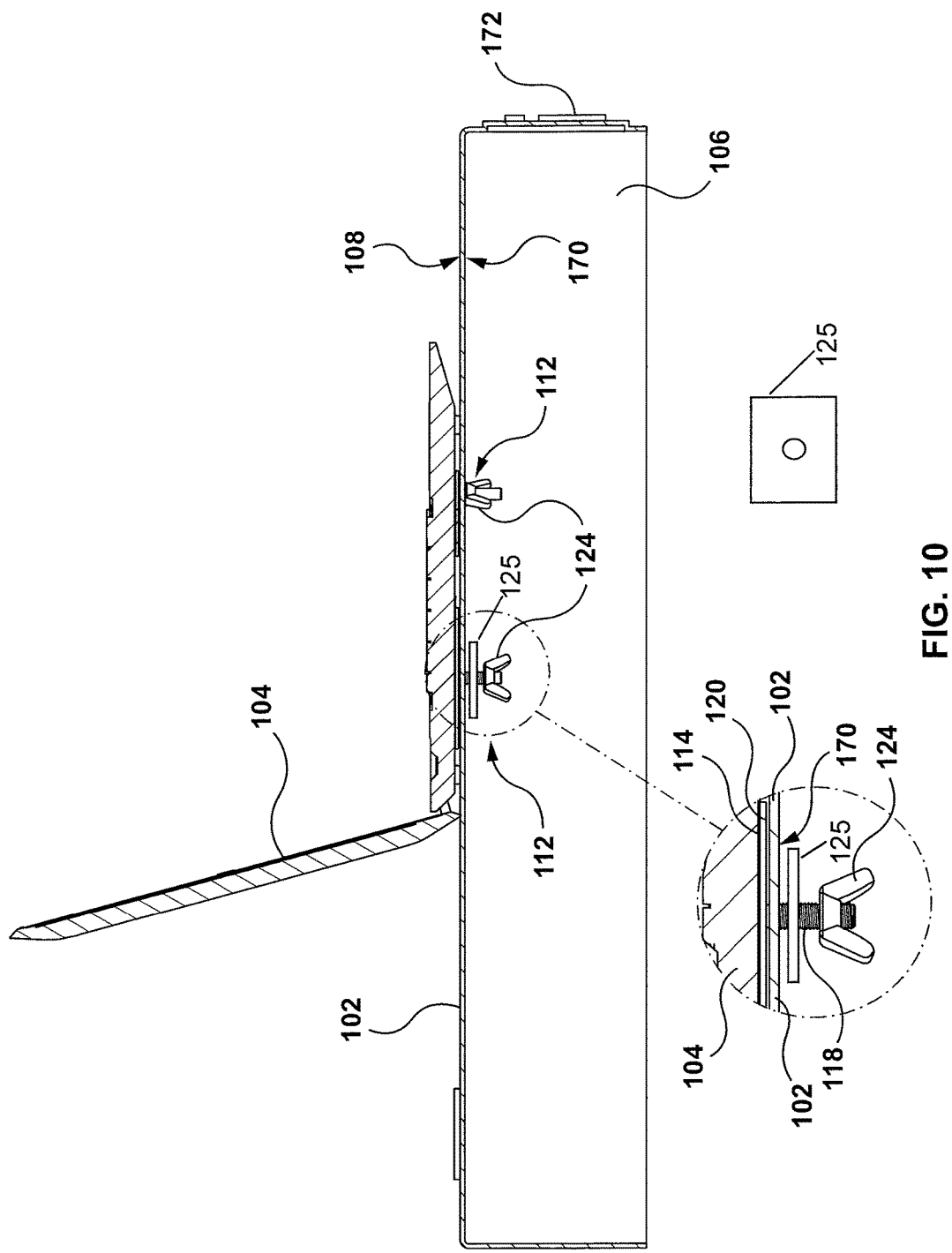
FIG. 10 is a sectional side view showing fasteners being used to secure the mounting devices and the component to the mounting platform.

As shown in FIG. 9, the mounting devices 112 are then secured by adhesive 122 in appropriate locations on the back surface of component 104 such that the studs 118 can be inserted through respective holes 110 of the mounting platform 102. As shown in the sectional view of FIG. 10, once studs 118 are inserted through the thru-holes 110 of mounting platform 102, fasteners 124 can be secured to the protruding stud ends to engage the back surface 170 of the mounting platform and secure the component 104 to the mounting platform 102. As shown in FIG. 10, in some examples an enlarged washer 125 (shown as having a rectangular configuration in FIG. 10) may be placed on one or more of the studs 118 between the fastener 124 and the mounting platform to provide increased surface area in engagement with the back surface 170 of the mounting platform 102. In some examples the faster may be provided with an integrated enlarged surface area to engage back surface 170. In some examples the stationary display structure 106 may include lockable doors 172 that can be opened to allow access to fasteners 124 and shut to prevent access.

Figure 11:
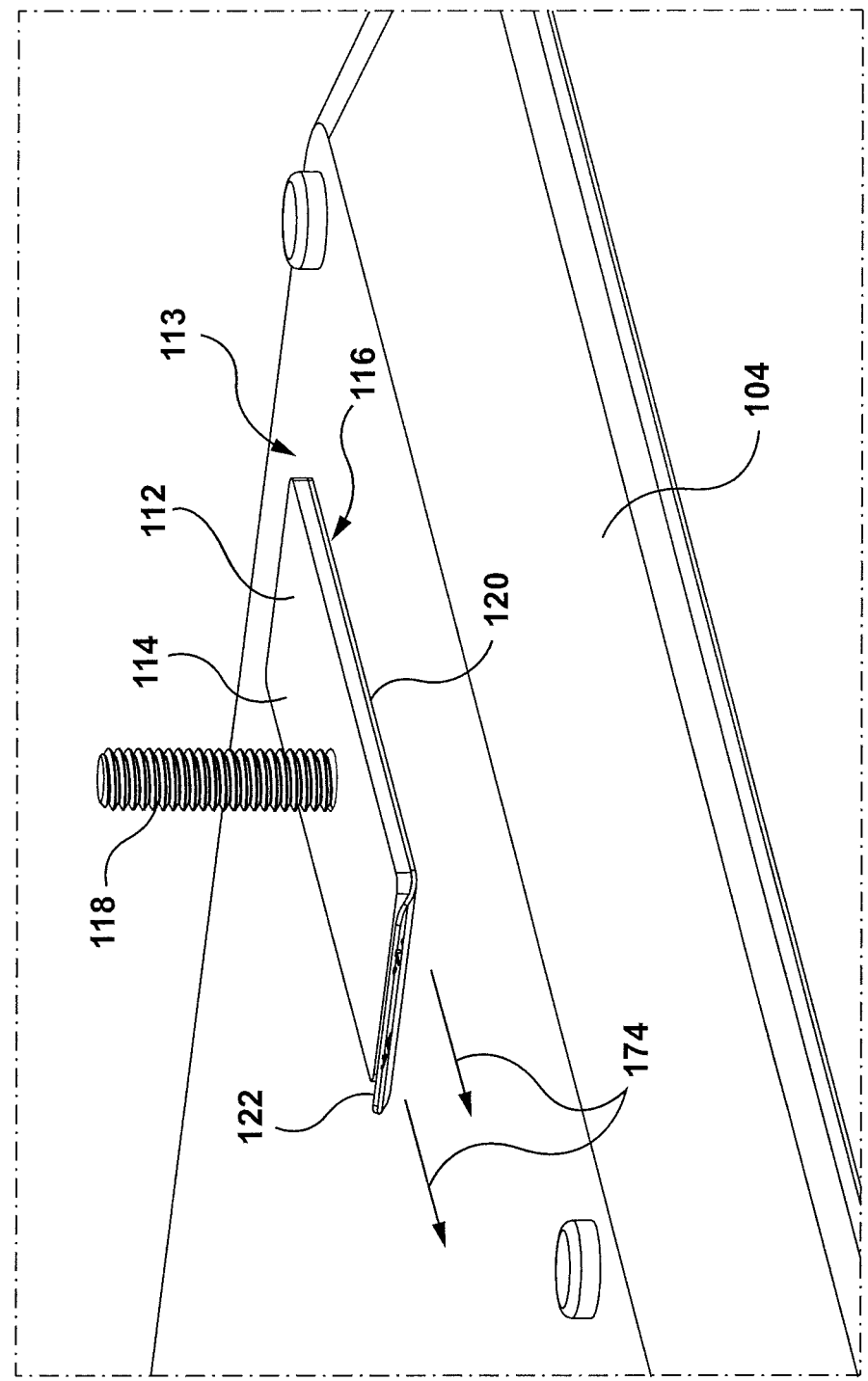
FIG. 11 is a perspective view showing removal of a mounting device from a component according to an example embodiment.

While component 104 is secured to platform 102 the adhesive 120 that secures the mounting devices 112 to the component 104 is sandwiched between component and platform and substantially inaccessible. In order to remove component 104 from the mounting platform 102 fasteners 124 are released from their respective studs 118, at which point the mounting devices 112 remain secured to the back surface 113 of the component by adhesive 122. Referring to FIG. 11, as previously noted, adhesive 120 can be simultaneously removed from mounting plate surface 116 and component surface 113 by grasping extending adhesive portion 122 and pulling it in a direction that is parallel to the opposed surfaces 116, 113, as shown by arrows 174 in FIG. 11.

Figure 12:
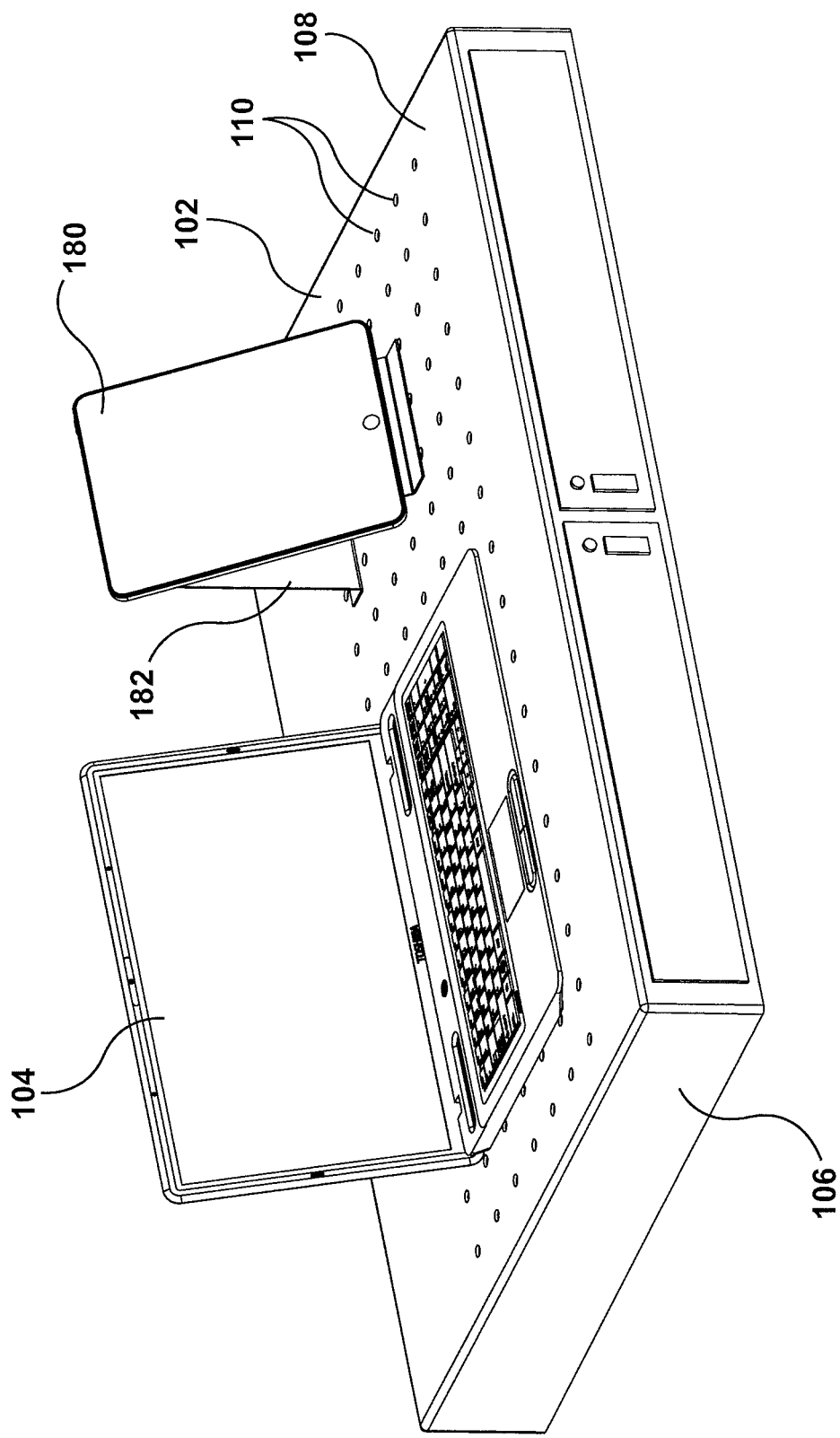
FIG. 12 is a perspective view showing two components mounted using the secure mounting system according to an example embodiment.
Figure 13:
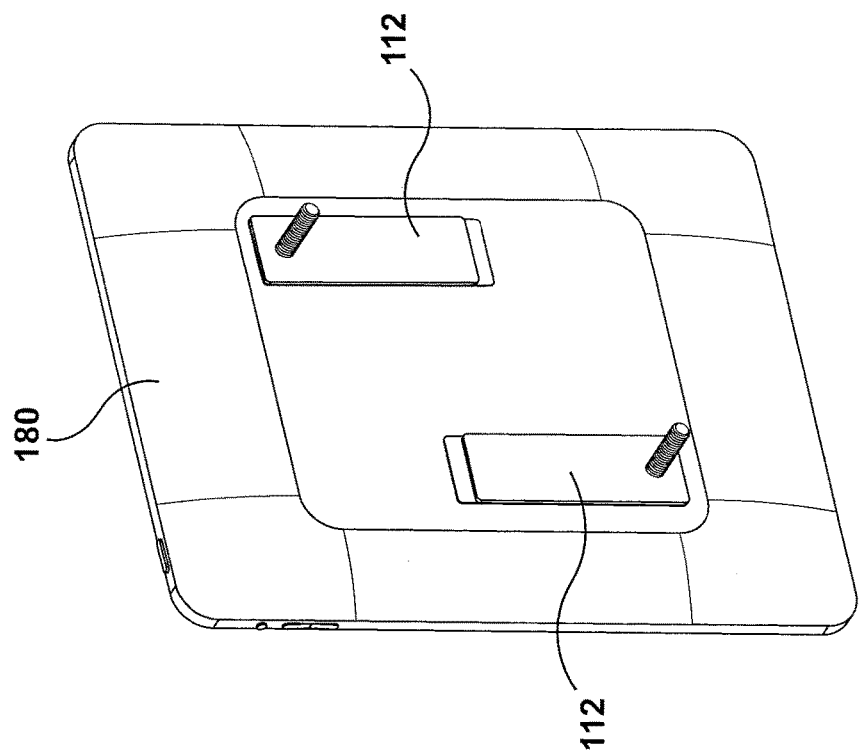
FIG. 13 shows the back of one of the components of FIG. 12 with mounting devices secured thereto.
Figure 14:
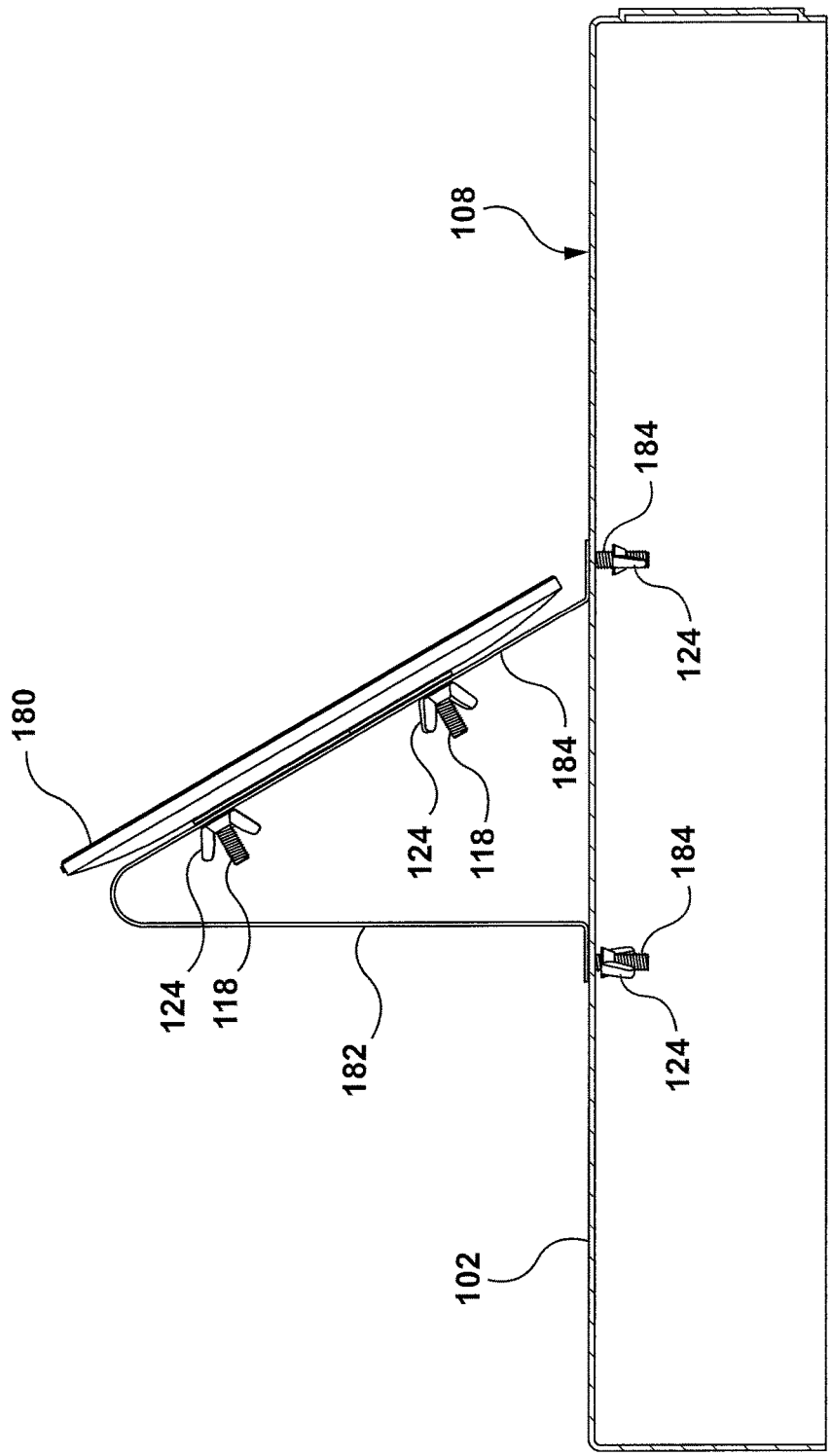
FIG. 14 is a sectional view of FIG. 12.
Figure 15:
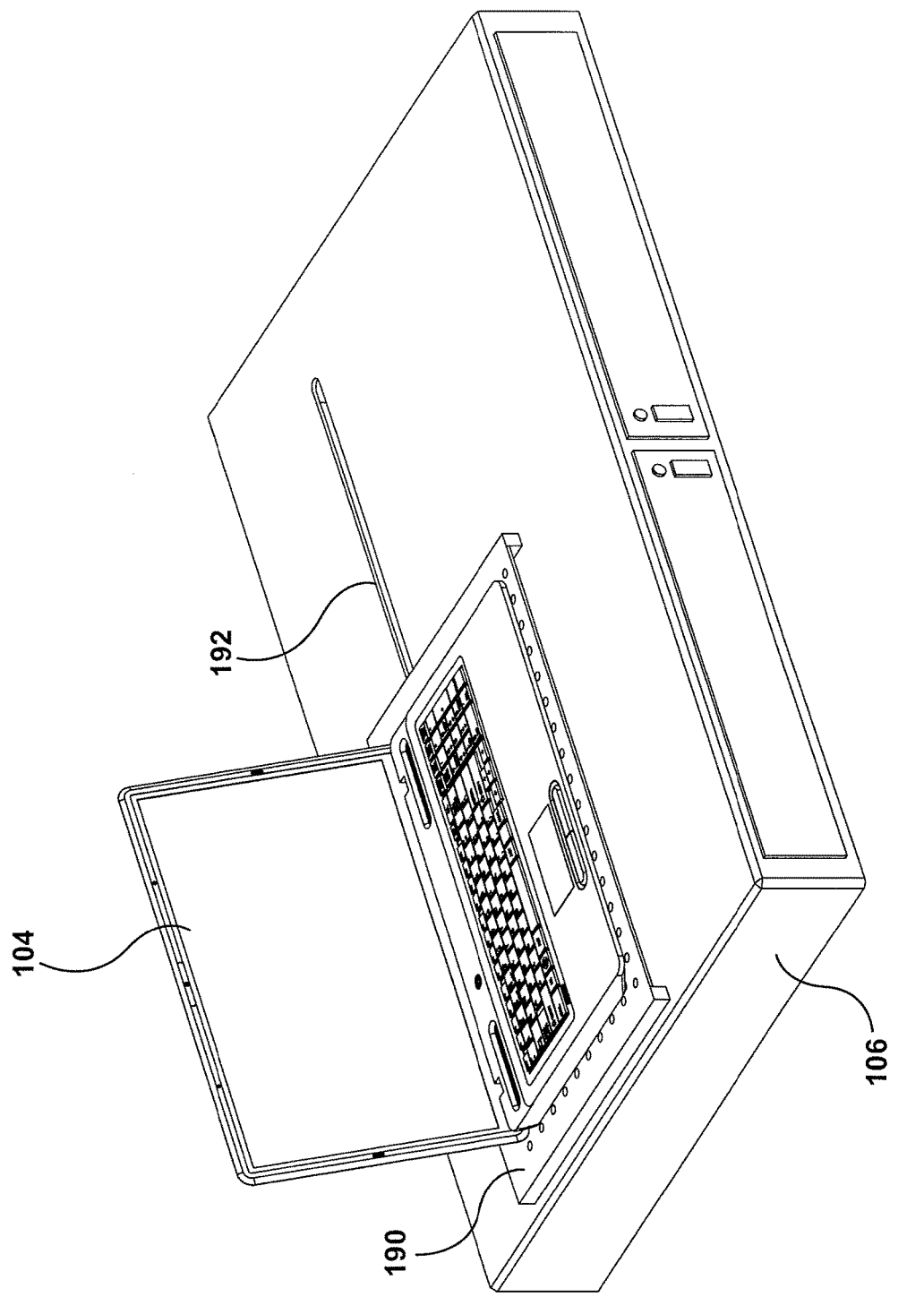
FIG. 15 is a perspective view of a further secure mounting system according to another example embodiment in which the system is used to secure a high theft risk component such as a laptop computer.
Figure 16:
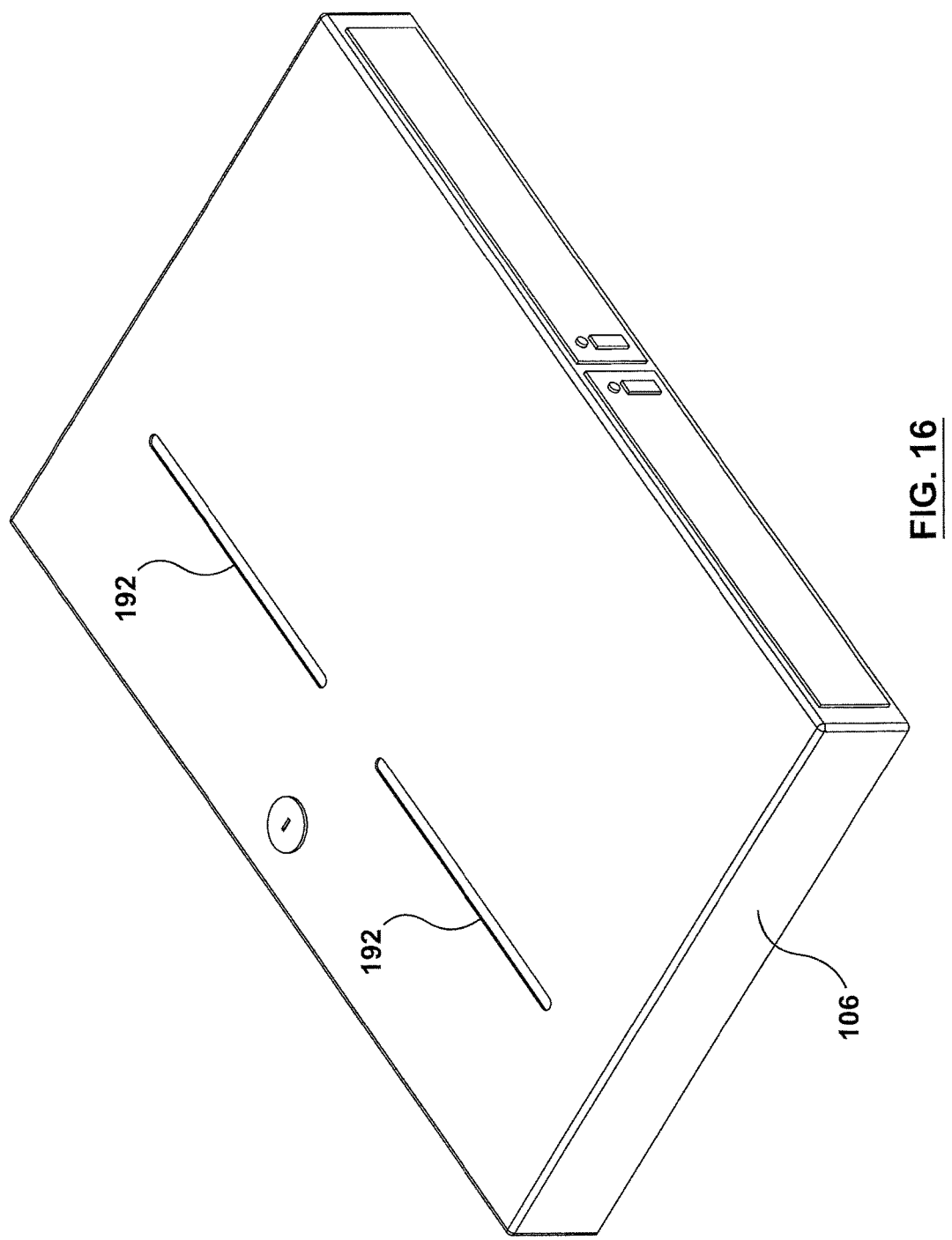
FIG. 16 is a perspective view of a base component of the system of FIG. 15.

The array of thru-holes 110 in mounting platform 102 allows the component 104 to be secured at a number of alternative locations on platform 102, and allows multiple components to be simultaneously mounted to platform 102. In this regard, FIG. 12 shows an example in which a first component 104 (laptop computer) and a second component 180 (a tablet or e-reader) are secured to mounting platform 102. Component 180 is secured to mounting platform 102 by an intermediate support structure 182. FIG. 13 shows possible locations for mounting devices 112 on the back surface of table-style component 180. Referring to FIG. 14, the intermediate support structure 182 includes an intermediate mounting platform 184 that includes an array of thru-holes arranged in a pattern that is identical to thru-holes 110 and template thru-holes 162 for receiving studs 118 to mounting the component 180 to the surface of the intermediate mounting platform 184. Fasteners 124 are used to releasably secure mounting devices 112 (and therefore component 180) in place on the intermediate mounting platform 184. The intermediate support structure 182 also includes a plurality of downwardly extending studs 184 that are appropriately spaced to be simultaneously inserted into thru-holes 110 of the base mounting platform 102 and secured in place by fasteners 124.

Figure 17:
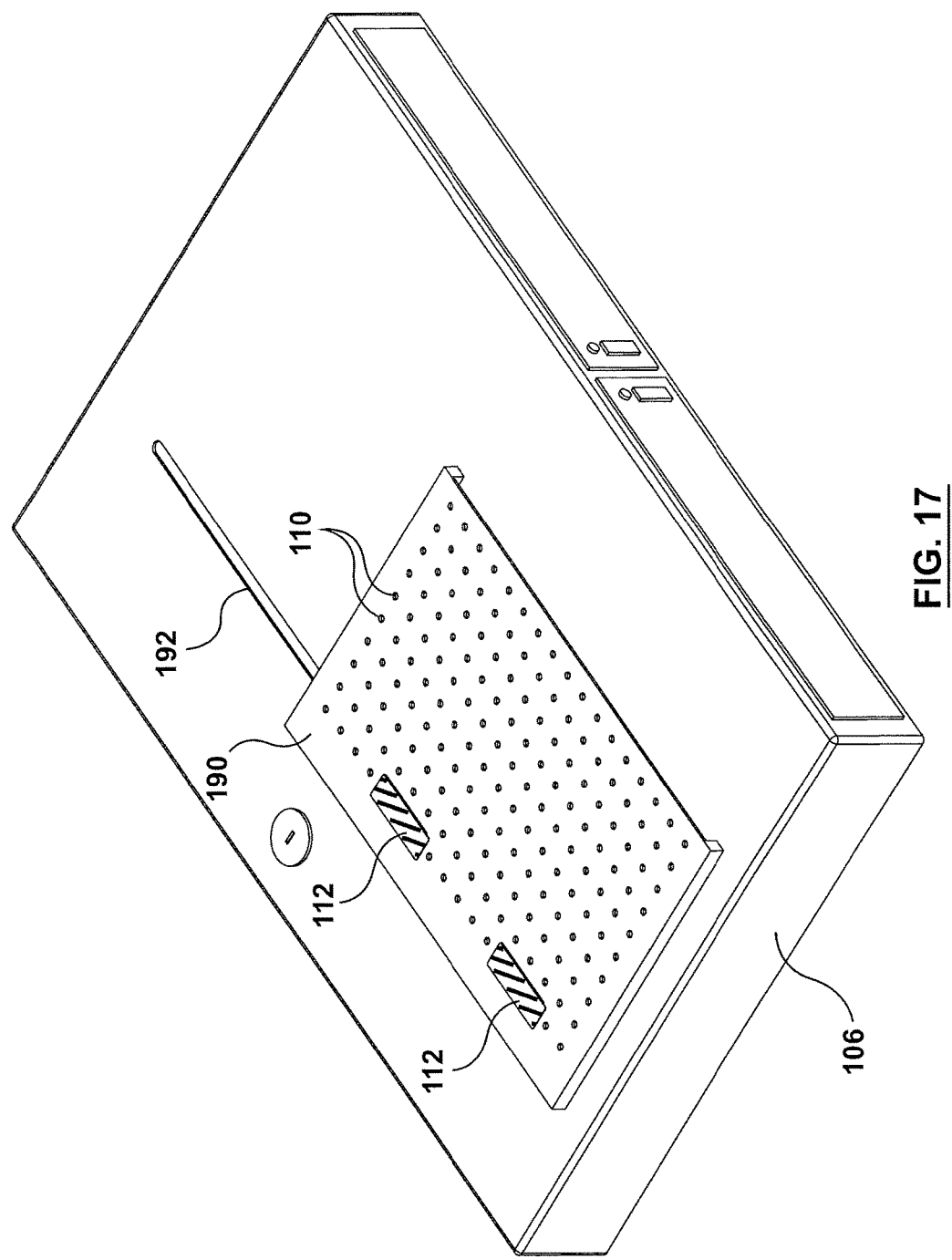
FIG. 17 is a perspective view of the base component and a mounting platform of the system of FIG. 15.
Figure 18:
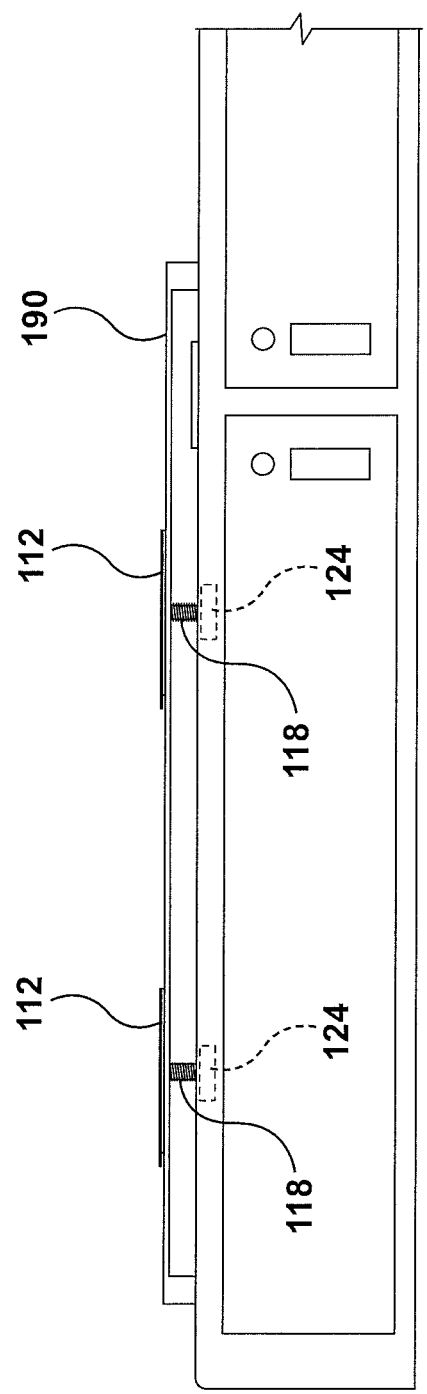
FIG. 18 is a partial front view of the base component and mounting platform of FIG. 17.
Figure 19:
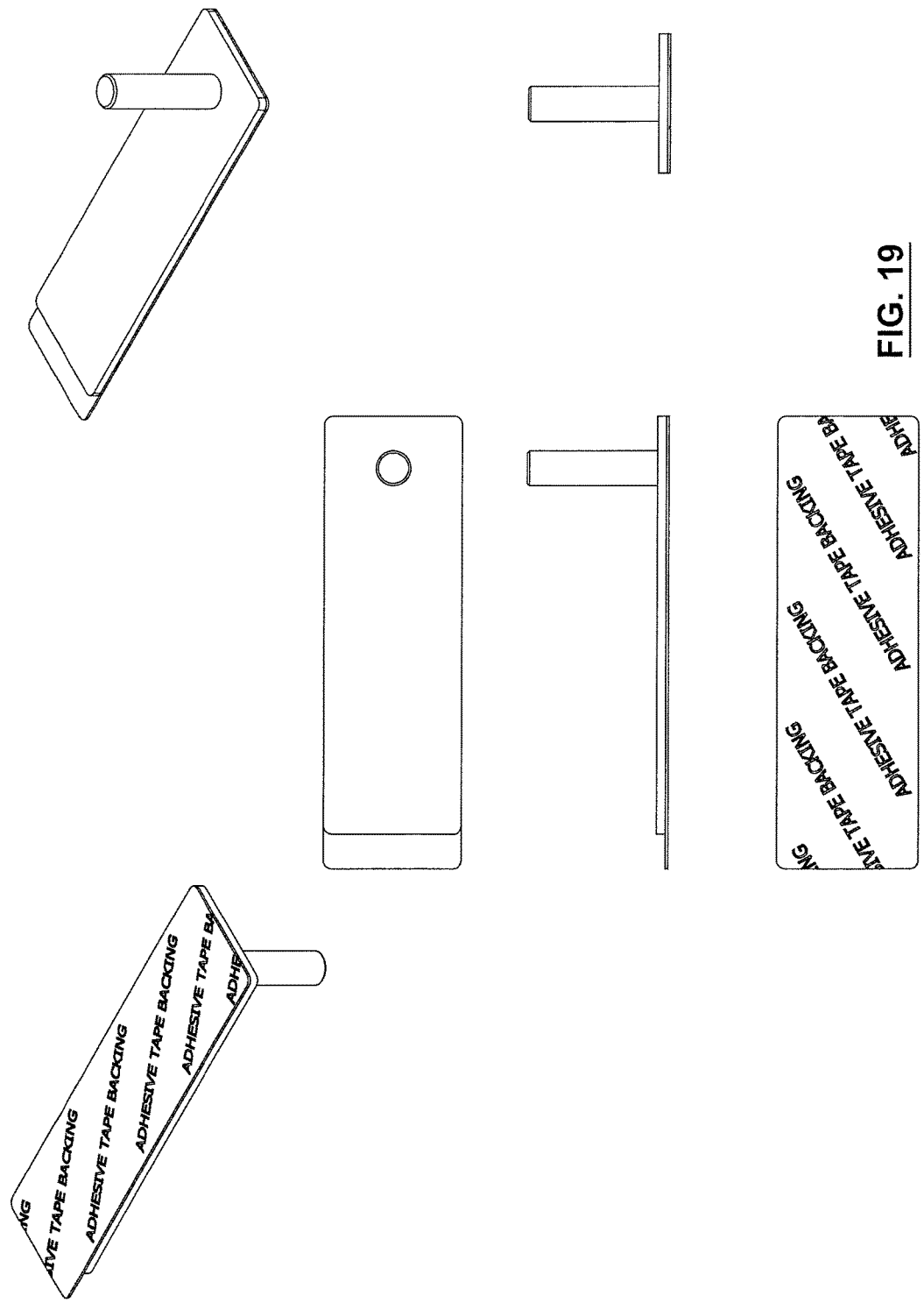
Figure 20:
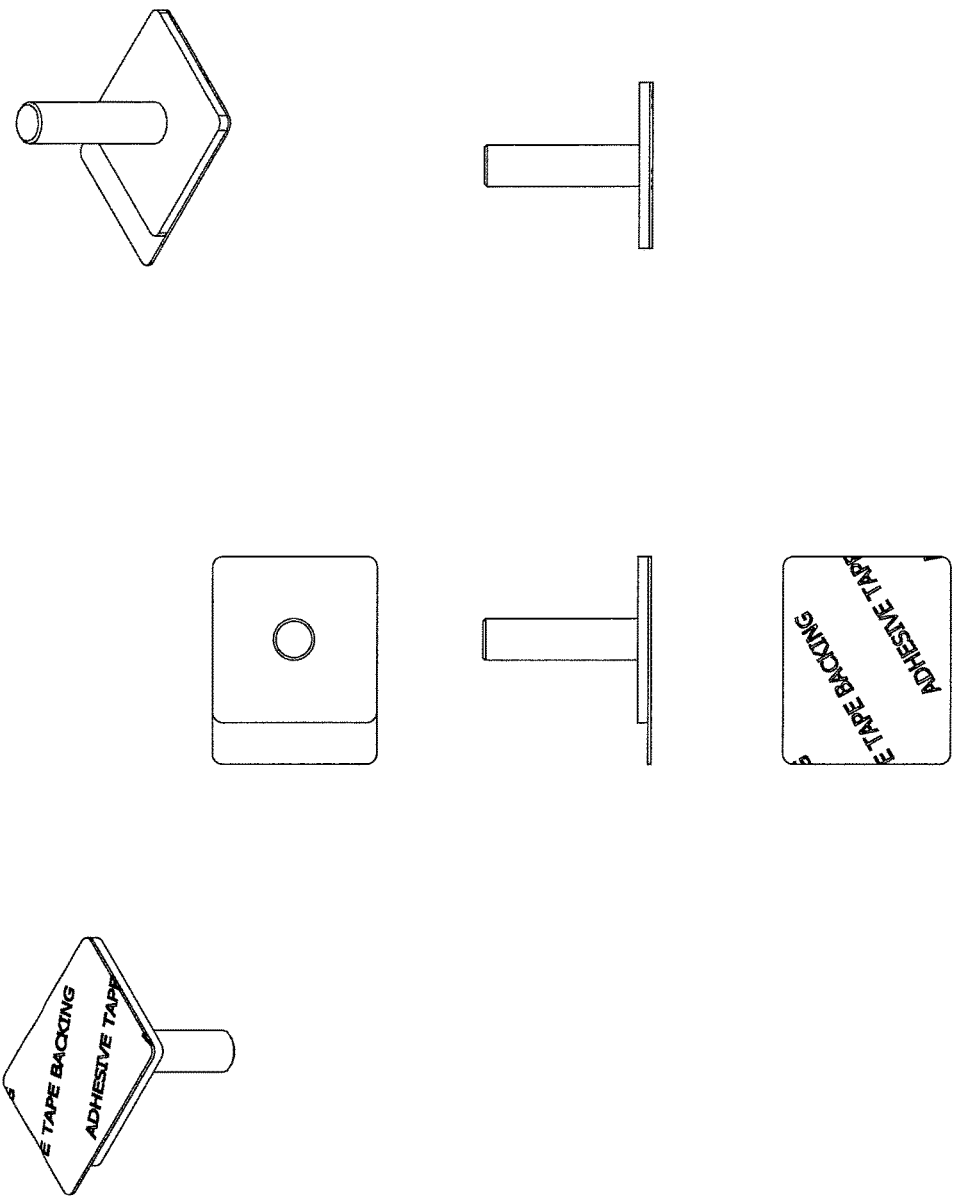
Figure 22:
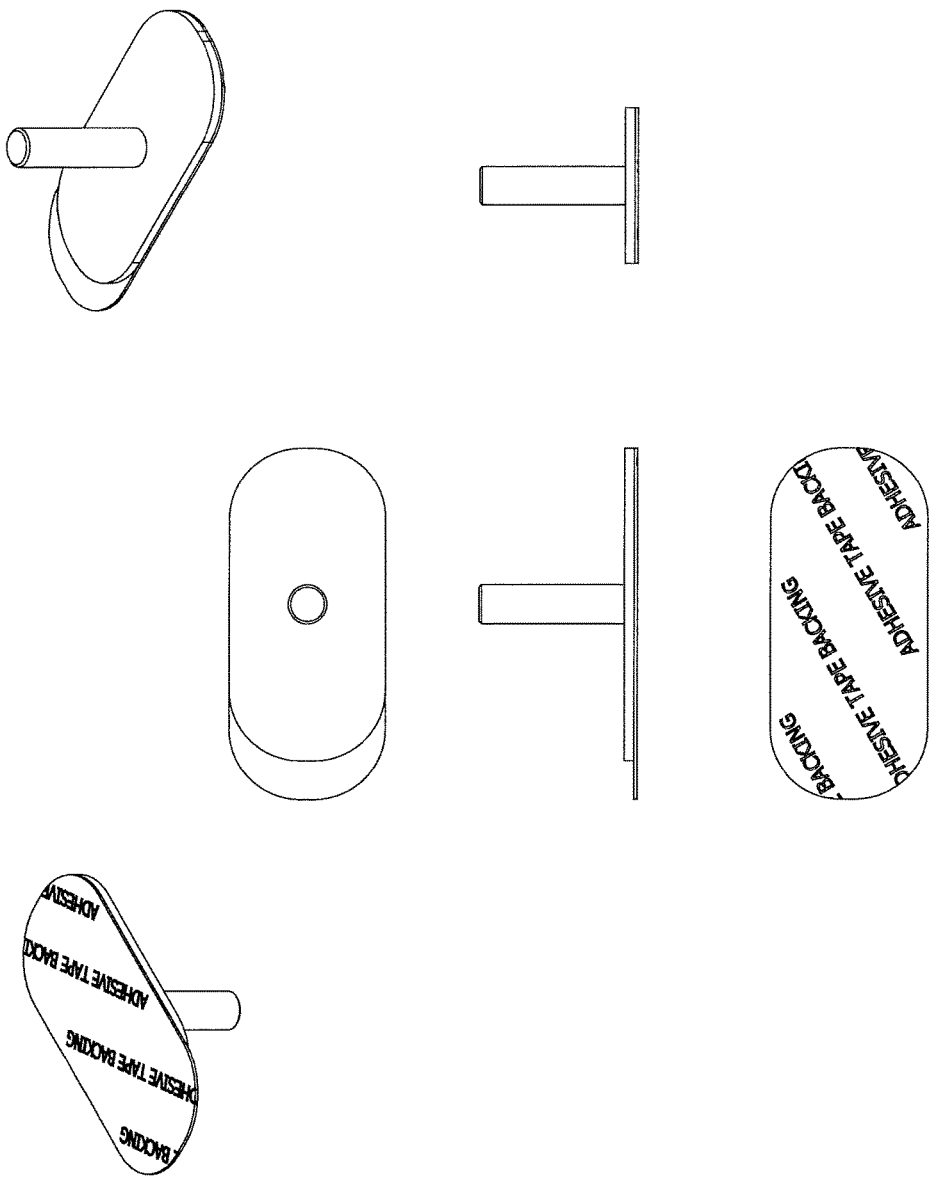
Figure 23:
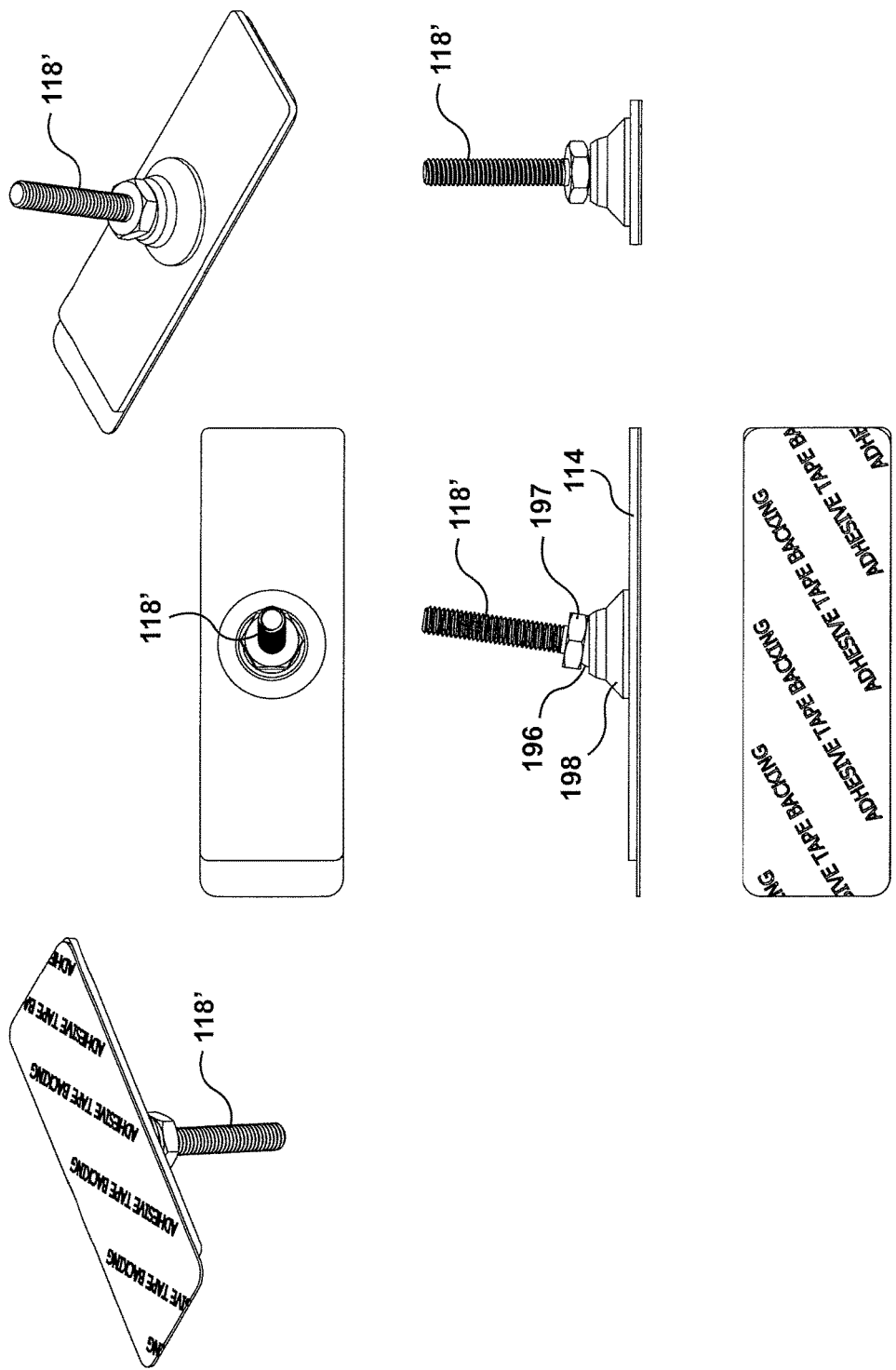
Figure 24:
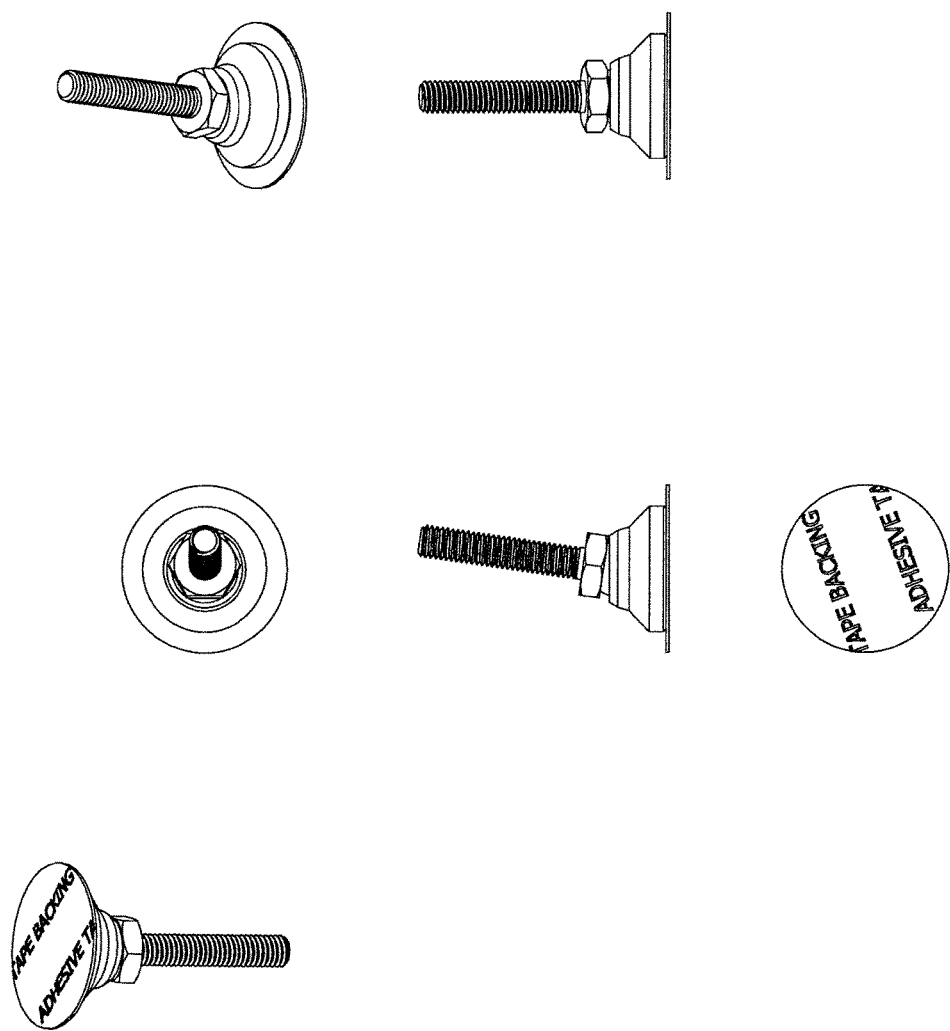

FIGS. 15-18 illustrate another embodiment in which the component 104 is secured to a horizontally arranged intermediate mounting platform 190, which is similar to mounting platform 102 except that it is removably secured to support structure 106. The component 190 can be mounted to intermediate mounting platform 190 in the same way that it can be mounted to platform 102. Support structure 106 includes one or more slots 192 (FIG. 16) in an upper support surface for receiving the studs 118, and as seen in FIGS. 17 and 18, mounting devices 112 can be used to secure intermediate mounting plate 190 to structure 106 by inserting the studs 118 through both the holes 110 in the platform 190 and the slots 192 in the structure 106 and securing the protruding ends of the studs with fasteners 124 (FIG. 18).

As noted above, mounting devices 112 can take a number of different shapes and configurations and FIGS. 19-24 each illustrate a number of different views of different configurations that can be used for different sized and types of components. In example embodiments, security system 100 is sold and distributed with a variety of different mounting device configurations. It will be note that the embodiments of FIGS. 23 and 24 do not have a stud that is rigidly attached to the mounting plate, but rather have a stud 118' that is mounted to mounting plate 114 by a ball and socket connector 196, 198 that allows the stud 118' a degree of movement relative to a perpendicular axis from plate 114. A stop nut 197 can be provided to adjust or limit the amount of movement of the stud 118'. A pivoting stud 118' can facilitate securing components in which the back surface has different surface portions that are not all located in a common parallel plane.

Additionally, in various embodiments, washers, nuts or other standoffs can be positioned on studs 118/118' between the component and the mounting platform 102 to raise the bottom surface 113 of the component 104 above the mounting platform surface 108 if desired for aesthetic or functional purposes such as product venting or to accommodate larger protuberances extending from the bottom surface 113.

Certain adaptations and modifications of the described embodiments can be made. Therefore, the above discussed embodiments are considered to be illustrative and not restrictive.

What is claimed is:

1. A mounting system for securely mounting a component, comprising:
    a mounting platform having a support surface with plurality of mounting holes extending therethrough;
    a mounting device for securing the component to the mounting platform, the mounting device comprising:
        a mounting plate with a planar surface facing in a first direction and a stud extending in a second direction away from the first direction, the stud being configured to be inserted through any one of the mounting holes;
        an adhesive secured to the planar surface and having an engagement surface for adhering to a surface of the component;
        a fastening device for releasably engaging a portion of the stud inserted through one of the mounting holes to releasably secure the mounting device to the mounting plate.

2. The system of claim 1 comprising a plurality of the mounting devices.

3. The system of claim 2 wherein the mounting holes are arranged in an array of rows and columns with uniform spacing in each row and uniform spacing in each column.

4. The system of claim 3 wherein the mounting platform forms an upper surface of a stationary display counter.

5. The system of claim 3 wherein the fastening device for at least some of the mounting devices is either a nut fastener having threads for engaging corresponding threads on the mounting plate stud or a fastener that has a pin for inserting through an opening on the mounting plate stud.

6. The system of claim 3 wherein the fastening devices for the mounting devices include at least two of the following: a nut fastener having threads for engaging corresponding threads on the stud; a cotter pin having a pin for inserting through an opening on the stud; and a lock actuated device having a shank for inserting through an opening on the stud.

7. The system of claim 3 comprising a transparent template having a plurality of template holes that align with the mounting holes of the mounting platform, the template facilitating alignment of the mounting devices on the surface of the component to permit the stud to be inserted through a mounting hole of the mounting plate.

8. The system of claim 3 further including an intermediate mounting platform having a support surface with plurality of mounting holes extending therethrough for receiving mounting device studs.

9. The system of claim 1 wherein a portion of the adhesive extends beyond an edge of the mounting plate to enable the portion of the adhesive to be grasped and pulled in a shear direction that is parallel to the planar surface to facilitate removal of the adhesive from between the planar surface and the surface of the component.

10. The system of claim 1 wherein the mounting plate planar surface has an area of at least 5 square inches covered with the adhesive.

11. The system of claim 1 wherein the adhesive on the mounting plate planar surface is covered with a removable backing on the engagement surface.

12. The system of claim 1 wherein the mounting plate includes a ball and socket joint securing the stud.

13. The system of claim 1 wherein the stud is clinched through an opening in a portion of the mounting plate.

* * * * *